(No Model.)
H. DURSTON.
MOLE TRAP.
No. 472,038. Patented Apr. 5, 1892.
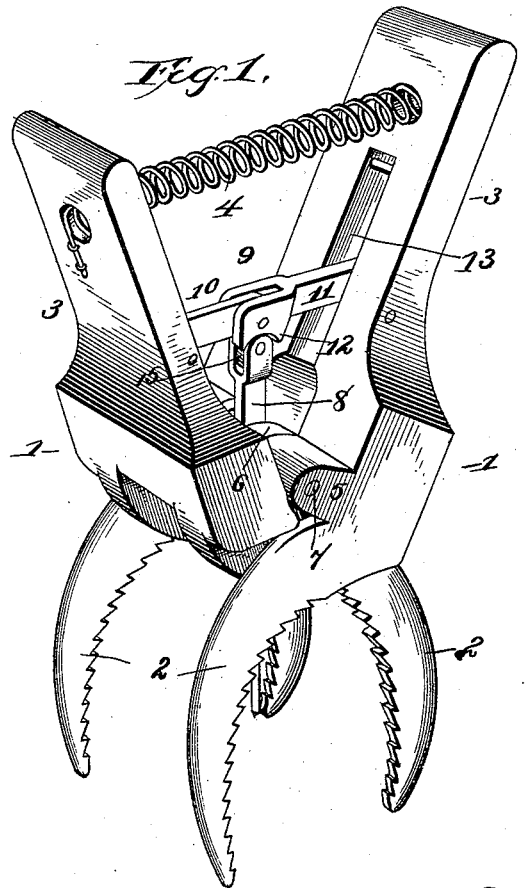
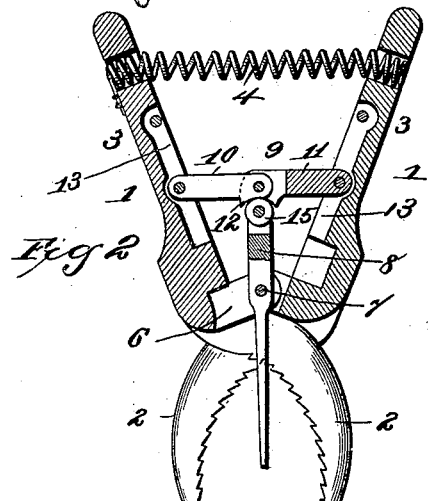
Witnesses
E. C. Wurdeman
H. J. Riley
Inventor
Herbert Durston
By his Attorneys,
C. A. Snow & Co.

UNITED STATES PATENT OFFICE.

HERBERT DURSTON, OF CARLINVILLE, ILLINOIS.

MOLE-TRAP.

SPECIFICATION forming part of Letters Patent No. 472,038, dated April 5, 1892.

Application filed December 3, 1891. Serial No. 413,872. (No model.)

*To all whom it may concern:*

Be it known that I, HERBERT DURSTON, a citizen of the United States, residing at Carlinville, in the county of Macoupin and State of Illinois, have invented a new and useful Mole-Trap, of which the following is a specification.

The invention relates to improvements in traps.

The object of the present invention is to provide a simply and comparatively inexpensive mole-trap which will be adapted to be readily set and which will be exceedingly sensitive and capable of being sprung by the slightest touch on the trigger.

The invention consists in the construction and novel combination and arrangement of parts hereinafter fully described, illustrated in the accompanying drawings, and pointed out in the claims hereto appended.

In the drawings, Figure 1 is a perspective view of a mole-trap constructed in accordance with this invention. Fig. 2 is a longitudinal sectional view.

Like numerals of reference indicate corresponding parts in both the figures of the drawings.

1 1 designate sections of a trap hinged together intermediate their ends, provided at their front ends with jaws 2 and having their rear ends 3 connected by a spiral spring 4, which, when the trap is sprung, is adapted to close the jaws upon an animal with considerable force. Each section is provided with a pair of concave jaws 2, provided on their inner edges with teeth and adapted to be spread by separating the rear ends 3 of the sections. The sections are provided intermediate their ends with perforated lugs 5 and 6, through which passes a pivot 7, which hinges the sections together and which pivots a trigger 8, arranged between the inner lugs 6 and extending rearward therefrom and adapted to engage a brace 9 to spring the trap. The brace 9 consists of hinged sections 10 and 11, which have their adjacent ends pivoted together and provided with curved notches 12 and which have their outer ends pivoted in recesses 13 in the inner faces of the sections, and the said sections 10 and 11 are adapted to form a straight brace to set the trap and hold the sections 1 separated. When the trap is set, the spiral spring 4 is distended, the brace-sections 10 and 11 are in alignment, and the inner end of the trigger, which is bifurcated and provided with a roller 15, is arranged in the curved notches of the brace-sections. A mole in passing through the jaws touches the trigger and moves the same slightly laterally, which is sufficient to throw the brace-section out of alignment and spring the trap, the roller 15 enabling the trigger to be moved without friction and making the trap exceedingly sensitive. The brace-section 11 has its notched end bifurcated, and the adjacent end of the section 10 is pivoted in this bifurcation. The ends of the spiral spring are secured in openings in the rear ends 3 of the trap.

From the foregoing description and the accompanying drawings the construction, operation, and advantages of the invention will be readily understood.

What I claim is—

1. In a trap, the combination of the sections 1, hinged together and provided at their front ends with jaws arranged in pairs, a spring connecting the rear ends of the sections 1, the brace composed of sections pivoted to the sections 1 and hinged together and provided in their adjacent ends with curved notches, and a pivotally-mounted trigger provided at its inner end with a roller arranged to engage the notches, substantially as described.

2. In a trap, the combination of the sections 1, hinged together and provided at their ends with jaws, and a spring, a toggle-jointed brace for holding the sections separated, and a trigger depending between the jaws and arranged to engage the brace to spring the trap, substantially as described.

In testimony that I claim the foregoing as my own I have hereto affixed my signature in the presence of two witnesses.

HERBERT DURSTON.

Witnesses:
 W. H. STEWARD,
 MOSES S. ELDRED.